(12) United States Patent
Thompson

(10) Patent No.: US 7,739,329 B2
(45) Date of Patent: Jun. 15, 2010

(54) WEB ASSISTANT

(75) Inventor: Paul Thompson, Bryanston (ZA)

(73) Assignee: Aspect Software, Inc., Lombard, IL (US)

( * ) Notice: Subject to any disclaimer, the term of this patent is extended or adjusted under 35 U.S.C. 154(b) by 853 days.

(21) Appl. No.: 10/278,367

(22) Filed: Oct. 23, 2002

(65) Prior Publication Data

US 2004/0083267 A1    Apr. 29, 2004

(51) Int. Cl.
  *G06F 15/16* (2006.01)
  *G06F 3/00* (2006.01)
(52) U.S. Cl. .................. 709/203; 709/204; 715/709
(58) Field of Classification Search ......... 709/203–207; 705/1; 715/709
  See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,094,655 A | 7/2000 | Rogers et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,295,551 B1 * | 9/2001 | Roberts et al. | 709/205 |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,404,884 B1 | 6/2002 | Marwell et al. | |
| 6,449,646 B1 * | 9/2002 | Sikora et al. | 709/226 |
| 6,480,885 B1 * | 11/2002 | Olivier | 709/207 |
| 6,732,156 B2 | 5/2004 | Miloslavsky | |
| 6,757,740 B1 * | 6/2004 | Parekh et al. | 709/245 |
| 6,912,563 B1 * | 6/2005 | Parker et al. | 709/204 |
| 7,080,321 B2 * | 7/2006 | Aleksander et al. | 715/708 |
| 7,330,873 B2 * | 2/2008 | Yoshida et al. | 709/203 |

(Continued)

OTHER PUBLICATIONS

U.S. Appl. No. 09/769,002, filed Jan. 23, 2001, Kippenbam et al.
U.S. Appl. No. 09/803,005, filed Mar. 8, 2001, Lindskog et al.
U.S. Appl. No. 09/767,951, filed Jan. 24, 2001, Clubb et al.

*Primary Examiner*—Nathan Flynn
*Assistant Examiner*—Joshua Joo
(74) *Attorney, Agent, or Firm*—Husch Blackwell Sanders Welsh Katz

(57) ABSTRACT

A method and apparatus for providing agent assistance to a client visiting a website of an organization. The method includes the steps of collecting contact information about the visit to the website by the client and connecting the client with an agent of the organization when the collected contact information exceeds a predetermined criterion.

42 Claims, 1 Drawing Sheet

U.S. PATENT DOCUMENTS

| | | | |
|---|---|---|---|
| 2001/0054041 A1* | 12/2001 | Chang | 707/5 |
| 2001/0056550 A1* | 12/2001 | Lee | 713/201 |
| 2002/0136167 A1* | 9/2002 | Steele et al. | 370/260 |
| 2003/0036980 A1* | 2/2003 | Wren | 705/27 |
| 2003/0053615 A1* | 3/2003 | Anderson et al. | 379/265.09 |
| 2003/0055705 A1* | 3/2003 | Kilpatrick | 705/9 |
| 2003/0167195 A1* | 9/2003 | Fernandes et al. | 705/8 |
| 2004/0039775 A1* | 2/2004 | Yoshida et al. | 709/203 |
| 2005/0097000 A1* | 5/2005 | Freishtat et al. | 705/26 |
| 2006/0165066 A1* | 7/2006 | Campbell et al. | 370/352 |

* cited by examiner

WEB ASSISTANT

FIELD OF THE INVENTION

The field of the invention relates to communication systems and more particularly to web sites.

BACKGROUND OF THE INVENTION

The use of websites for disseminating information is generally known. Typically an organization provides a server set up as a website and disseminates a universal resource locator (URL) of the website to the public either through the Internet or by mass media advertising.

Visitors may access the website by entering the URL of the website into a browser of their computer. The browser, in turn, composes and sends an information request packet addressed to the URL of the website.

The packet is received by the server and processed by a website application. The website application retrieves a webpage the corresponds to the URL and downloads the webpage to the visitor.

Each webpage downloaded to the browser of the visitor may contain softkeys (hyperlinks) that allow the visitor to travel to other related (or unrelated) webpages. The use of softkeys and related explanatory textual information on a webpage allows the visitor to navigate through a website to areas of interest.

While existing websites are often well planned and easy to navigate, they may not always meet the needs of all visitors. For example, some visitors to a website may not enter the website with the same level of knowledge as other visitors to the website. Accordingly, a need exists for a means of supplementing information presented through a webpage based upon the optional use of a human contact.

SUMMARY

A method and apparatus for providing agent assistance to a client visiting a website of an organization. The method includes the steps of collecting contact information about the visit to the website by the client and connecting the client with an agent of the organization when the collected contact information exceeds a predetermined criterion.

DETAILED DESCRIPTION OF AN ILLUSTRATED EMBODIMENT

Figure 1:
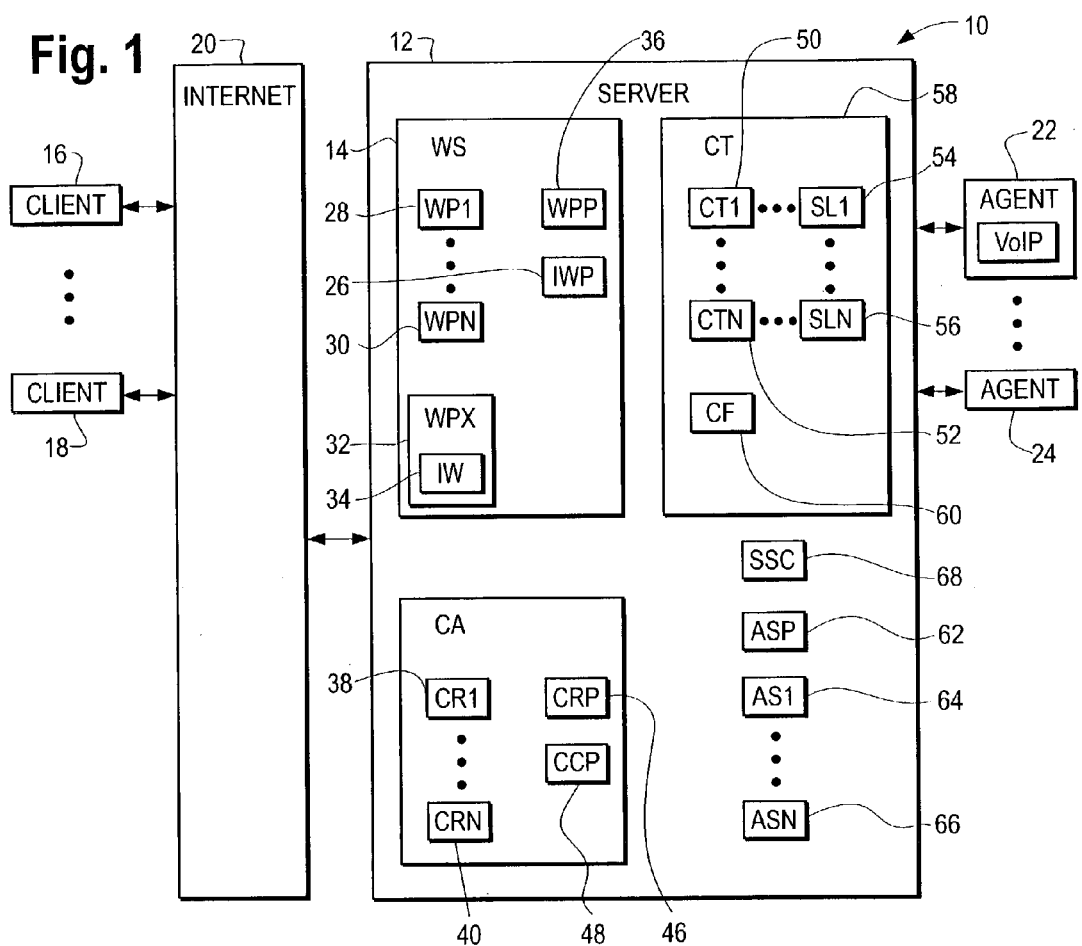
FIG. 1 depicts an automatic agent help system for visitors to a website, shown in a context of use, and in accordance with an illustrated embodiment of the invention.

FIG. 1 depicts an automatic agent help system 10 for visitors to a website, shown generally under an illustrated embodiment of the invention. Under the illustrated embodiment, data is collected from contacts by visitors to the website and the data is evaluated against certain criterion or criteria. As used herein, collecting contact information (i.e., data) about a visit to a website means collecting information about access activity such as detecting and storing an IP address of the website visitor and, possibly, identifiers of webpages visited, information entered through interactive windows displayed upon webpages, repetitive activity such as repeated visits to the same webpage or cookies retrieved from the browser of the visitor. If the contact information meets the criterion (or criteria) of the organization, the visitor is offered optional help from an agent.

If the visitor accepts the offer of help, then an agent qualified to help the visitor is connected with the visitor. If the visitor declines or does not respond to the offer, then no further attempt is made to help the visitor.

In general, FIG. 1 depicts an Internet-based information resource (e.g., a website 14 located within a server 12). The website 14 may be used by an organization (e.g., a merchant, a political or environmental organization, etc.) to disseminate information for purposes of advancing the agenda of the organization.

The organization using the website 14 may promulgate (by advertising or otherwise) a URL for reaching the website 14 of the organization. Alternatively, the organization may index the subject matter of the website 14 and promulgate the subject matter indexes to various search engines (e.g., Yahoo, Google, etc.). The server 12 may also monitor other websites (e.g., Netscape) and post ads to the browser of each visitor.

Contained within the website 14 of the organization may be an introductory webpage 26 and a number of other webpages 28, 30, 32. Depicted within the introductory webpage 26 or other webpages 28, 30, 32 may be descriptive information and hyperlinks (softkeys) to other webpages.

Other special function softkeys may be provided within the webpages 28, 30, 32 for webpage specific functions (e.g., indication of a desire to purchase a product from a merchant organization, indication of a desire to contribute to a charitable organization, etc.) Also included within one or more webpages (e.g., 32) may be an interactive window 34 for entering descriptive information (e.g., demographic information, credit card number, etc.) in association with the special function softkeys.

Figure 2:
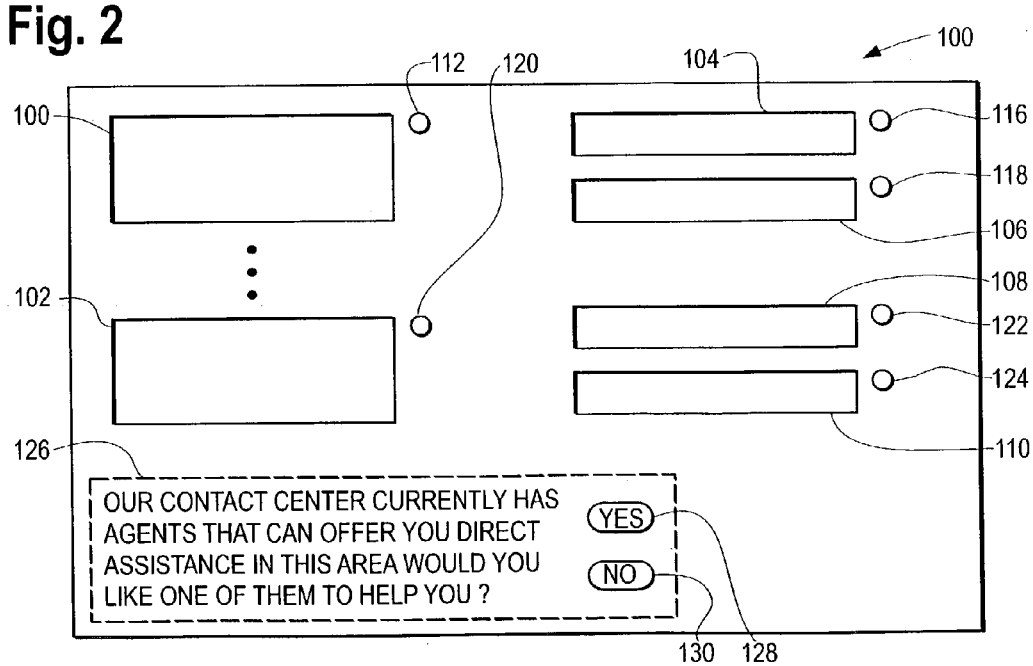
FIG. 2 depicts a webpage that may be used by the system of FIG. 1.

FIG. 2 depicts an example of a webpage 26, 28, 30, 32 (now labeled 100 in FIG. 2) that may be provided by the website 14. As shown, descriptive information (e.g., text, graphical information, etc.) may be provided in one or more text or graphics boxes 100, 102, 104, 106, 108, 110. Softkeys 112, 114, 116, 118, 120, 122, 124 may be provided to obtain additional information or to make decisions regarding already available information displayed within the boxes 100, 102, 104, 106, 108, 110.

Using the URL of the website 14, a client (e.g., 16) of the organization may access the website 14. To access the website 14, the client 16 may enter the URL of the website 14 into a browser of a terminal of the client 16 and activate an ENTER key. In response, the browser of the client 16 may transmit a packet to a webpage processor 36 of the website 14.

Upon receipt of the packet, the webpage processor 36 may download the introductory webpage 26 to the client 16. The client 16 may review the information and may activate a softkey on the introductory webpage 26 to download another webpage 28, 30, 32.

In response, the browser of the client 16 may compose another packet including the URL associated with the softkey and transmit the packet to the webpage processor 36. In response, the webpage processor 36 may download the requested webpage 28, 30, 32.

The client 16 may continue to browse through webpages 28, 30, 32 and collect information. Alternatively, the client 16 may choose to make some request involving a special function softkey or enter information into the interactive window 34. The activation of the special function softkey and/or entry of information through the information window 34 may be processed according to the programming of the webpage processor 36.

In addition to servicing information requests based upon activation of softkeys and accepting the entry of information, the webpage processor 36 may also collect and transfer contact information about the client 16, 18 to a client records processor 46. For example, during any initial information (e.g., webpage) request, the client record processor 46 may open a contact record 38, 40 using at least the Internet Protocol (IP) address of the client 16, 18 (retrieved from the request packet) as a file identifier.

Once opened, the client record processor 46 may enter any other contact information (e.g., web pages visited, softkeys activated, information entered through an interactive window, etc.) to the file. The webpage processor 36 may also retrieve and transfer any cookies stored in the browser of the client 16, 18 as further information about previous visits by the client 16, 18 to the website 14.

Once opened, the content of the client records 38, 40 may be compared with a predetermined criterion or criteria for offering agent assistance. Where a client record 38, 40 meets at least one of the predetermined criteria, the client 16, 18 may be offered the assistance of an agent 22, 24 of the organization that owns or controls the website 14.

Stored within a memory 58 of the server 12 may be a set of files 50, 52 containing criteria for offering help to a client. The criteria files 50, 52 may contain one or more conditions for offering help to a client 16, 18. Each file 50, 52 may have an associated skill set 54, 56 that would be required of an agent 22, 24 to service a client 16, 18 under that criterion.

In order to determine whether a client 16, 18 should be offered assistance, the record 38, 40 of each client 16, 18 may be compared with the criteria 50, 52. In this regard, a client record processor 46 may retrieve each client record 38, 40 and the criteria 50, 52. A client record comparator 48 may compare each record 38, 40 with each criterion of the set of criteria 50, 52.

As used herein, meeting the criterion means that a client record 38, 40 contains one or more entries that matches or exceeds the contents of one of the files 50, 52. The set of criteria 50, 52 may be based upon any of a set of disparate conditions. For example, if the organization is a merchant, one criterion may be a threshold level of repeated visits to a particular webpage of products. In this case, the client records processor 46 may review client records 38, 40 and identify duplicate entries regarding the webpages visited during a current session and prior sessions. The webpages visited in prior sessions may be obtained from the cookies retrieved by the webpage processor 36 from the browser of a client 16, 18.

Another criterion may be related to the detection of the entry of credit card information into an interactive window 34 without sufficient information to determine the purpose of the entry. The criterion, in this case, may be a template of the minimal set of information needed to complete the transaction. For example, if the organization is a political or environmental organization soliciting donations, then the minimum information needed may be the credit card identifier and donation amount. In the case of a merchant, the minimum information may be a credit card identifier, a product selection and a shipping address.

Another criterion may be related to the identity of the client 16, 18. If the organization is a merchant, a list of important clients may be maintained in a set of customer files 60 along with indicia of the relative importance of each client and the products in which their importance lies. In this case, the criterion may, again, be a template including the IP address of the client 16, 18, webpages associated with the product of importance and, possible, a minimum purchase level over a prior time period.

where the content of the client record (e.g., 38) meets or exceeds the threshold value provided by a criterion (e.g., 50), the call record processor 46 may transfer the file 38 and associated criteria 50 to an agent selection processor 62. The agent selection processor 62, upon receiving an identifier of the criterion 50, retrieves the associated skill set 54 required to select an agent 22, 24. Upon retrieving the skill set 54, the agent selection processor 62 may determine which agents 22, 24 are available (i.e., idle) and retrieve a skill rating 64, 66 for each available agent 22, 24.

Upon retrieving agent skills 64, 66 for each available agent, the agent selection processor 62 may transfer the agent skills 64, 66 to a skill selection comparator 68 to determine whether any of the available agents exceeds the skill set 54 required to handle the contact. If an agent (e.g., 22) is found to exceed the requirements, then the agent selection processor 62 selects that agent 22 and instructs the webpage processor 36 to offer the services of the selected agent 22 to the client 16.

To offer the client 16 the option of receiving help, the webpage processor 36 may download an applet that presents a notification 126 (FIG. 2) to the client 16. Included within the notification 126 are softkeys 128 130 that allow the client 16 to accept or decline the offer.

If the client 16 activates the NO button 130, the refusal is transferred to the agent selection processor 62 and the process is terminated. The refusal may also be sent to the client record processor 46. The client record processor 46 may enter the refusal into the client record 38, 40. Once entered into the record 38, 40, no further offers are sent to the client 16, 18 during this session.

If the client should activate the YES button 128, the acceptance is sent to the agent selection processor 62. Upon receiving the acceptance, the agent selection processor 62 functions to set up a conversation between the client 16 and the selected agent 22.

The set-up of a communication link may be established under any of a number of different formats. Under a first format, the link may be set up under an instant messaging format. Under this format, the agent selection processor 62 may send the IP address of the client 16 to the selected agent 22 along with a current webpage viewed by the client 16, the contents of the client record 38 and the criterion met by the client 16. The client records 38 may be displayed on a terminal of the agent 22 along with the current webpages and criterion.

The notification box 126 on the client's terminal may be replaced by a chat box that is duplicated on the agent's terminal. The client 16 and agent 22 may then converse to resolve the concerns of the client 16.

During the conversation between the selected agent 22 and client 16, the agent 22 may answer questions and download additional information to the client 16. Optionally, the agent 22 may direct other webpages 28, 30, 32, 34 to the client 16 or request that the webpage processor 36 download those webpages directly to the client 16.

As an alternative to the use of instant messaging, the agent selection processor 62 may send the IP address of the client 16 to a Voice over Internet Protocol (VoIP) application within the terminal of the agent 22, 24. If the agent selection processor 62 should receive an acceptance of help from the client 16, 18, the processor 62 sends instructions to the terminal of the agent activating the VoIP, thereby creating a voice link between the client 16, 18 and the agent 22, 24.

The automatic agent help utility 10 allows the organization to offer prompt help to visitors in a manner that is tailored to the environment of the organization. Further, by selecting an agent who is familiar with the information viewed by the visitor, the objectives of the organization are advanced in a manner that is cost-efficient and adaptable to the needs of the visitor.

A specific embodiment of a method and apparatus for helping a website visitor has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of providing agent assistance to a client currently visiting a website of an organization, the method comprising the steps of:
   collecting contact information about client activity during the current visit to the website and during prior session visits to websites by the client and maintaining information about the websites visited during the prior session visits by the client; and
   associating with the client a skills set of skills required of an agent to assist the client;
   downloading an applet to the client offering a voice contact with an agent of the organization including an accept softkey and a decline softkey, the downloading pre-conditioned upon selecting an available agent with skills that exceed the skill set and who is familiar with information viewed by the client during the current visit and upon the collected contact information including from the websites visited during prior session visits meeting a predetermined first criterion of disparate conditions wherein activating the decline softkey disables further offers of a voice contact until a new session is initiated.

2. The method of providing agent assistance as in claim 1 further comprising connecting the client by a voice contact to the agent of the organization by actuating the downloaded applet when the collected contact information meets a second predetermined criterion.

3. The method of providing agent assistance as in claim 2 wherein the applet presents an offer to the client including an accept softkey and a decline softkey and further comprising establishing a voice connection between the client and the agent of the organization when the client activates the accept softkey of the downloaded applet to accept the offer.

4. The method of providing agent assistance as in claim 3 further comprising sending an IP address of the client to a VOIP application at a terminal of the agent which is activated in response to client activating the accept softkey.

5. The method of providing agent assistance as in claim 2 further comprising a plurality of criteria files each criteria file containing criteria including at least one condition for offering help and each criteria file having an associated skill set wherein each criteria file is compared to the contact information of the client to determine if any of the criteria have been met.

6. The method of providing agent assistance as in claim 5 wherein the step of connecting the client by a voice contact further comprises selecting an agent to assist the client based on the associated skill set of any criteria file having criteria that have been met.

7. The method of providing agent assistance as in claim 1 wherein the first criterion is a threshold of repeated visits to any particular webpage during different sessions.

8. The method of providing agent assistance as in claim 1 further comprising the step of detecting an Internet protocol address of the client and comparing the detected Internet protocol address with a predetermined list of clients.

9. The method of providing agent assistance as in claim 1 wherein the step of collecting contact information further comprises detecting an identity of any webpages visited by the client and wherein the first criterion is a website visit to a webpage associated with a product of importance and a minimum purchase level over a prior time period.

10. The method of providing agent assistance as in claim 1 wherein the step of collecting contact information further comprises detecting any information entered through an interactive window on any webpages visited by the client.

11. The method of providing agent assistance as in claim 1 wherein the first criterion includes a template including an IP address of the client and of a webpage associated with a product of importance, and a minimum purchase level over a prior period of time.

12. The method of providing agent assistance as in claim 1 further comprising the step of forming a skills list required for a conversation with the client based upon the collected contact information and comparing the formed skills list with a skills list of any available agents.

13. The method of providing agent assistance as in claim 12 wherein the step of comparing the formed skills list with a skills list of any available agents further comprises selecting an agent with a closest match with the formed skills list, and transferring an Internet protocol address of the client and a current webpage being viewed by the client to a terminal of the selected agent.

14. The method of providing agent assistance as in claim 1 wherein the predetermined first criterion is a template of a minimal set of client entered information needed to complete a transaction.

15. An apparatus for providing agent assistance to a client currently visiting a website of an organization, the apparatus comprising:
   means for collecting contact information about the current visit to the website by the client and about prior session visits to websites by the client; and
   means for downloading an applet to the client offering a voice contact with an agent of the organization including a decline softkey, the downloading conditioned upon prior selection of an available agent with sufficient skills and with familiarity with information viewed by the client during the current session and upon the collected contact information and the website visited during the prior session visits meeting a first predetermined criterion of disparate conditions without request for assistance by the client, wherein activating the decline softkey disables further offers of a voice contact until a new session is initiated.

16. The apparatus for providing agent assistance as in claim 15 further comprising means for connecting the client by a voice contact to the agent of the organization by activating the downloaded applet when the collected contact information meets a second predetermined criterion.

17. The apparatus for providing agent assistance as in claim 16 further comprising means for establishing a voice connection between the client and the agent of the organization when the client activates the downloaded applet including sending an IP address of the client to a VOIP application at a terminal of the agent and activating the VOIP application when the client activates the applet.

18. The apparatus for providing agent assistance as in claim 16 wherein the applet presents an offer notification to the client including an accept softkey and a decline softkey, and further comprising means for establishing a chat session between the client and the agent of the organization when the client activates the accept softkey of the downloaded applet to accept the offer.

19. The apparatus for providing agent assistance as in claim 17 further comprising a plurality of criteria files each criteria file containing criteria including at least one condition for offering help and each criteria file having an associated skill set, and means for comparing each criteria file to the contact information of the client to determine if any of the criteria have been met.

20. The apparatus for providing agent assistance as in claim 19 wherein the means for establishing a voice connection further comprises means for selecting an agent to assist the client based upon the skill set associated with any criteria file whose criteria have been met.

21. The apparatus for providing agent assistance as in claim 15 wherein the first criterion met is transferred to a terminal of the selected agent for display.

22. The apparatus for providing agent assistance as in claim 15 further comprising means for detecting an Internet protocol address of the client and means for comparing the detected Internet protocol address with a predetermined list of clients.

23. The apparatus for providing agent assistance as in claim 15 wherein the means for collecting contact information further comprises means for detecting an identity of any webpages visited by the client.

24. The apparatus for providing agent assistance as in claim 15 wherein the means for collecting contact information further comprises means for detecting any information entered through an interactive window on any webpages visited by the client.

25. The apparatus for providing agent assistance as in claim 15 wherein the first criterion includes a template including an IP address of the client and of a webpage associated with a product of importance and a minimum purchase level over a period of time.

26. The apparatus for providing agent assistance as in claim 15 further comprising means for forming a skills list required for a conversation with the client based upon the collected contact information and means for comparing the formed skills list with a skills list of any available agents for selecting an agent of the available agents who is familiar with information viewed by client during the visit to the website by the client.

27. The apparatus for providing agent assistance as in claim 26 wherein the means for comparing the formed skills list with a skills list of any available agents further comprises means for selecting an agent with a closest match with the formed skills list and transferring an Internet protocol address of the client and a current webpage being viewed by the client to a terminal of the selected agent.

28. The apparatus for providing agent assistance as in claim 15 wherein the first criterion is a template of a minimal set of client entered information needed to complete a transaction.

29. An apparatus for providing agent assistance to a client currently visiting a website of an organization, the apparatus comprising:
 a contact record to collect contact information about client activity during the current visit to the website by the client and contact information about prior session visits to websites by the client; and
 a webpage processor adapted to download an applet to the client offering a voice contact with an agent of the organization including an accept softkey and a decline softkey, the downloading conditioned upon prior selection of an agent with familiarity with information viewed by the client during the current session and upon the collected contact information including the information about prior session visits to websites meeting a first predetermined criterion of disparate conditions and wherein activating the decline softkey disables further offers of a voice contact until a new session is initiated.

30. The apparatus for providing agent assistance as in claim 29 further comprising an agent selection processor adapted to connect the client by a voice contact to the agent of the organization by activating the downloaded applet when the collected contact information meets a second predetermined criterion.

31. The apparatus for providing agent assistance as in claim 29 wherein the applet presents an offer notification to the client including an accept softkey and a decline softkey and further comprising a voice over Internet protocol application adapted to establish a voice connection between the client and the agent of the organization when the client activates the accept softkey of the downloaded applet.

32. The apparatus for providing agent assistance as in claim 30 further comprising a plurality of criteria files each criteria file containing criteria including at least one condition for offering help and each criteria file having an associated skill list wherein each criteria file is compared to the contact information of the client to determine if any of the criteria have been met.

33. The apparatus for providing agent assistance as in claim 30 wherein the first criterion includes an IP address of the client and of webpages associated with a product of importance, and a minimum purchase level over a period of time.

34. A method for providing agent assistance to a client visiting a website of an organization the method comprising the steps of:
 collecting data about client activity during the website contact and about client activity during prior visits to the website;
 downloading an applet to the client offering a voice contact with the agent of the organization including a decline softkey, the downloading conditioned upon prior selection of an agent with familiarity with information viewed by the client during the current session and upon the collected data meeting a predetermined criteria of disparate conditions; and
 wherein activating the decline softkey disables further offers of a voice contact between the client and the agent of the organization until a new web session is initiated.

35. The method of routing the website contact as in claim 34 wherein the step of collecting data further comprises detecting an Internet protocol address of the client and comparing the detected Internet protocol address with a predetermined list of clients.

36. The method of routing the website contact as in claim 34 wherein the applet presents an offer notification to the client including an accept softkey, and wherein activating the accept softkey initiates a voice contact between the client and the agent and wherein the disparate conditions include a threshold of repeated visits to a particular web page during different web sessions.

37. The method of routing the website contact as in claim 34 wherein the step of collecting data further comprises detecting an identity of any webpages visited by the client and wherein the first criterion is a visit to a high importance webpage and a minimum purchase level over a prior time period.

38. The method of routing the website contact as in claim 34 wherein the step of collecting data further comprises detecting any information entered through an interactive window on any webpages visited by the client.

39. The method of routing the website contact as in claim 34 further comprising a plurality of criteria files each criteria file containing criteria including at least one condition for offering help and each criteria file having an associated skill set wherein each criteria file is compared to the collected data to determine if any of the criteria have been met.

40. The method of routing the website contact as in claim 34 wherein the step of collecting data further comprises forming a skills list based upon the collected data and the step of forming a skills list further comprises comparing the formed skills list with a skills list of any available agents.

41. The method of routing the website contact as in claim 40 wherein the step of comparing the formed skills list with a skills list of any available agents further comprises selecting an agent with a closest match with the formed skills list.

42. The method of routing the website contact as in claim 34 comprising transferring the Internet protocol address of the client to a voice over Internet protocol application within a terminal of the selected agent.

* * * * *